US008335575B2

(12) United States Patent
Papenfort et al.

(10) Patent No.: US 8,335,575 B2
(45) Date of Patent: Dec. 18, 2012

(54) CONTROL SYSTEM FOR EXECUTING MANUFACTURING PROCESSES

(75) Inventors: Josef Papenfort, Hüllhorst (DE); Ralf Heitmann, Leopoldshöhe (DE); Gerd Hoppe, Rheda-Wiedenbrück (DE); Itzko Christow, Gütersloh (DE)

(73) Assignee: Beckhoff Automation, GmbH, Verl (DE)

( * ) Notice: Subject to any disclaimer, the term of this patent is extended or adjusted under 35 U.S.C. 154(b) by 210 days.

(21) Appl. No.: 12/704,156

(22) Filed: Feb. 11, 2010

(65) Prior Publication Data
US 2010/0211201 A1 Aug. 19, 2010

Related U.S. Application Data

(63) Continuation of application No. PCT/EP2008/060858, filed on Aug. 19, 2008.

(30) Foreign Application Priority Data

Aug. 21, 2007 (DE) .................. 10 2007 039 425

(51) Int. Cl.
G05B 11/01 (2006.01)
G06F 19/00 (2006.01)
(52) U.S. Cl. ........... 700/23; 700/7; 700/25; 700/96
(58) Field of Classification Search .......... 700/1, 7, 700/11, 23–25, 95–96, 160, 181; 710/8–10
See application file for complete search history.

(56) References Cited

U.S. PATENT DOCUMENTS

| | | | | |
|---|---|---|---|---|
| 4,455,602 A * | 6/1984 | Baxter et al. | ...... | 710/5 |
| 4,525,780 A * | 6/1985 | Bratt et al. | ...... | 711/163 |
| 4,648,064 A * | 3/1987 | Morley | ...... | 710/45 |
| 5,359,507 A * | 10/1994 | Egami | ...... | 700/23 |
| 5,687,074 A * | 11/1997 | Tanaka et al. | ...... | 700/26 |
| 5,889,470 A * | 3/1999 | Kaycee et al. | ...... | 370/465 |
| 5,933,435 A * | 8/1999 | Shah et al. | ...... | 714/749 |
| 6,026,485 A * | 2/2000 | O'Connor et al. | ...... | 712/226 |
| 6,347,334 B1 * | 2/2002 | Fredericks et al. | ...... | 709/220 |
| 6,571,300 B2 * | 5/2003 | Pitot et al. | ...... | 710/6 |
| 6,725,281 B1 * | 4/2004 | Zintel et al. | ...... | 719/318 |
| 6,897,675 B2 * | 5/2005 | Donley et al. | ...... | 326/38 |
| 7,155,297 B2 * | 12/2006 | Schor | ...... | 700/86 |
| 7,305,278 B2 * | 12/2007 | Enright et al. | ...... | 700/115 |

(Continued)

FOREIGN PATENT DOCUMENTS
DE 10101745 8/2002
(Continued)

OTHER PUBLICATIONS

Chung, Sheng-Luen et al., "Fabulous MESs and C/Cs: an Overview of Semiconductor Fab Automation Systems", *IEEE Robotics &Automation Magazine*,. vol. 11, No. 1, Mar. 2004, pp. 8-18.

(Continued)

*Primary Examiner* — Ramesh Patel
(74) *Attorney, Agent, or Firm* — Dorsey & Whitney LLP

(57) ABSTRACT

A control node has a sequence table and subscribers, with the sequence table having data records each having an identification for an action of a manufacturing sequence associated with the control node, an identification for a subscriber carrying out the action and an identification of a parameter set associated with the action, and wherein each subscriber has a sequence interpreter which is designed to read and to interpret the sequence table, and to initiate the actions associated with the subscriber.

26 Claims, 9 Drawing Sheets

U.S. PATENT DOCUMENTS

| | | | |
|---|---|---|---|
| 7,774,073 B2 * | 8/2010 | Cane et al. | 700/3 |
| 7,788,476 B2 * | 8/2010 | McNutt et al. | 713/1 |
| 7,792,043 B2 * | 9/2010 | McNutt et al. | 370/242 |
| 2003/0177979 A1 * | 9/2003 | Crum et al. | 118/668 |
| 2004/0138767 A1 * | 7/2004 | Donley et al. | 700/87 |
| 2008/0091931 A1 * | 4/2008 | McNutt et al. | 713/1 |
| 2008/0125885 A1 * | 5/2008 | McNutt et al. | 700/81 |
| 2008/0133789 A1 * | 6/2008 | McNutt et al. | 710/30 |
| 2010/0141657 A1 * | 6/2010 | Gamper et al. | 345/440.1 |

FOREIGN PATENT DOCUMENTS

| | | |
|---|---|---|
| JP | 2000-214913 | 8/2000 |
| JP | 2005-235070 | 9/2005 |
| WO | WO-2004/055609 | 7/2004 |

OTHER PUBLICATIONS

Moyne, James R. et al., "A Generic Cell Controller for the Automated VLSI Manufacturing Facility", *IEEE Transactions on Semiconductor Manufacturing*, vol. 5, No. 2, May 1992, pp. 77-87.

Wijayah, H., "Reconfigurable Factory-wide Resource-based System Integration for Control", *IEEE International Conference on Electro/information Technology*, May 7-10, 2006, pp. 125-130.

Translation of Japanese Office Action issued by the Japanese Patent Office in connection with Japanese Patent Application No. 2010-521416. Feb. 7, 2012. 3 pages.

* cited by examiner

FIG 4B

| | bExecute [BOOL] | | | | | | bWaitForDone [BOOL] | | | | | | Recipeindex [INT] | | | | | |
|---|---|---|---|---|---|---|---|---|---|---|---|---|---|---|---|---|---|---|
| | RFID Read | Data Provide | Sync | Lock-ing | Con-veyor | RFID Write | RFID Read | Data Provide | Sync | Lock-ing | Con-veyor | RFID Write | RFID Read | Data Provide | Sync | Lock-ing | Con-veyor | RFID Write |
| Index/Step | | | | | | | | | | | | | | | | | | |
| 0 | | 1 | | | | | | | | | | | | | | | | |
| 1 | 1 | | | | | | 1 | | | | | | | | | | | |
| 2 | | | 1 | | | | | 1 | | | | | 0 | | | | | |
| 3 | | | | 1 | | | | | 1 | | | | | 0 | | | | |
| 4 | | | | | 1 | | | | | 1 | | | | | 0 | | | |
| 5 | | | | 1 | | | | | 1 | | | | | | | 0 | | |
| 6 | | | 1 | | | | | | | 1 | | | | | 1 | | 0 | |
| 7 | | | | 1 | | | | | | | 1 | | | | 2 | 1 | | |
| 8 | | | | | | 1 | | | | | | 1 | | 1 | | | | |
| 9 | | 1 | | | | | | 1 | | | | | | | | | | 0 |

FIG 4C

| Index | iProdStateReq | iProdStates | Distance | Velocity | tTimeout |
|---|---|---|---|---|---|
| 0 | 0x000F | 0x0010 | 2000 | 2000 | T#2s |
| 1 | 0x000F | 0x0010 | 1000 | 1000 | T#1s |
| 2 | 0x01FF | 0x0200 | 1000 | 1000 | T#1s |

FIG 4D

| | | bExecute [BOOL] | | | bWaitForDone [BOOL] | | | RecipeIndex [INT] | | |
|---|---|---|---|---|---|---|---|---|---|---|
| | Skills (32 Max) | Sync | Gripper | Glue | Sync | Gripper | Glue | Sync | Gripper | Glue |
| ModuleIn | RecipeIndex | | | | | | | | | |
| 0 | 0 | | | | | | | | | |
| 1 | 1 | 1 | | | 1 | | | 0 | | |
| 2 | 2 | | 1 | | | 1 | | | 0 | |
| 3 | 3 | | | 1 | | | 1 | | | 0 |
| 4 | 4 | | | 1 | | | 1 | | | 1 |
| 5 | 5 | 1 | | | 1 | | | 2 | | |

| Step | DWORD lProdStateReq | DWORD lProdStates | BOOL bSync1Dire | ARRAY[0...lMA E_SyncQ bSync1Enable | E_SyncQ eSync1Qua | BOOL bSync2Dire | ARRAY[0... E_SyncQu bSync2Enab | E_SyncQu eSync2Qua | BOOL bSync3Dire | ARRAY[0.. E_SyncQ bSync3Enab | E_SyncQ eSync3Qua | Time tTimeout |
|---|---|---|---|---|---|---|---|---|---|---|---|---|
| 0 | 0x0003 | 0x0004 | 0 | 0x0003 | AND | 0 | 0x0000 | OR | 0 | 0x0000 | OR | T#2s |
| 1 | 0x003F | 0x0040 | 0 | 0x0000 | OR | 1 | 0x0000 | OR | 0 | 0x0000 | OR | T#2s |
| 2 | 0x007F | 0x0080 | 0 | 0x0000 | OR | 0 | 0x0000 | OR | 0 | 0x0003 | AND | T#2s |

CONTROL SYSTEM FOR EXECUTING MANUFACTURING PROCESSES

CROSS-REFERENCE TO RELATED APPLICATIONS

This application is a continuation of PCT Application No. PCT/EP2008/060858 filed Aug. 19, 2008, which claims priority to German Application No. 10 2007 039425.1, filed Aug. 21, 2007. The entire content of both applications is hereby incorporated by reference.

FIELD

The present invention relates to a control node and to a control system.

BACKGROUND

Present-day concepts for industrial automation are based on the idea of decentralized controlling. The control tasks to be carried out are divided up among the control nodes of the decentralized control system in a geographically and functionally optimal manner. Thereby, the control nodes communicate with each other and with the superordinate system via local networks. By means of the decentralized control, the time and effort involved in the communication process may be reduced as the individual control nodes autonomously take over control tasks relating to their respective areas and only have to communicate with the further control nodes and/or with the superordinate system for coordination purposes.

In this context, the decentralized control is based on the idea of subdividing automation tasks among individual functional and logically complete modules which may then be arranged in close proximity to the process, thus reducing the wiring and installation involved. By subdividing into modules, complexity may be reduced in order to enable a simpler functionality.

Open systems are a further trend in automation technology which enable the user to combine automation components from various manufacturers. This allows for the utilization of the best technical solution to individual partial tasks by the user and for choosing the most inexpensive manufacturer. An essential demand to automation components in open systems is connectability, i.e. the individual automation components must in principle be able to exchange data. Open systems further require their automation components to be interoperable, i.e. the individual automation components must comprise defined profiles in order to guarantee that said components cooperate when the automation task is carried out. Finally, open systems require the interchangeability of automation components from various manufacturers, i.e. the devices of the manufacturers have to provide the same functional scope.

In spite of the increasing use of decentralized open control systems and the cost advantages resulting therefrom, a return of investment problem still exists in industrial automation, particularly due to increasingly shortened product cycles. Although new products are already developed in a way to allow for their simple automated production, the automation systems for manufacturing the products are usually specifically designed for the product to be manufactured and thus, adapting them to product and process changes is only possible by means of a high amount of time and effort.

SUMMARY

The present invention provides a control node and a control system, which allow for a flexible system management.

One embodiment of the invention provides a control node having a sequence table and subscribers. The sequence table comprises data records each having an identification for an action of a manufacturing sequence associated with the control node, an identification for a subscriber carrying out the action and an identification of a parameter set associated with the action. Each subscriber has a sequence interpreter which is designed to read and to interpret the sequence table, and to initiate the actions associated with the subscriber.

Another embodiment of the invention provides a control system for executing manufacturing processes comprising control nodes connected to each other via a data communication network. The manufacturing process is divided up into manufacturing sequences comprising actions, the manufacturing sequences to be carried out by the respective control nodes. Each control node comprises a sequence table and subscribers, the sequence table comprising data records with a respective identification for an action of a manufacturing sequence associated to the control node, an identification for a subscriber executing the action and an identification of a parameter set associated with the action, and each subscriber comprising a sequence interpreter which is designed to read and to interpret the sequence table, and to initiate the action associated with the subscriber.

Another embodiment of the invention provides a control node having a sequence table and subscribers. The sequence table comprises data records with a respective identification for an action of a manufacturing sequence associated to the control node, an identification for a subscriber executing the action and an identification of a parameter set associated with the action. Each subscriber comprises a sequence interpreter which is designed to read and to interpret the sequence table, and to initiate the actions associated with the subscriber, wherein a subscriber is configured as a synchronization component designed to generate signalling data according to an action associated in the sequence table, the sequence interpreter of at least one further subscriber processing the sequence table on the basis of the signalling data of the synchronization component.

Another embodiment of the invention provides a control system for executing manufacturing processes comprising control nodes connected to each other via a data communication network. The manufacturing process is divided up into manufacturing sequences comprising actions, the manufacturing sequences to be carried out by the respective control nodes and each control node as a subscriber comprises a receiving synchronization component for receiving signalling data from further control nodes as well as a transmitting synchronization component for outputting signalling data to further control nodes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 4A-4D illustrate a manufacturing process showing a conveyor belt and an adhesive unit having grippers as two control nodes, whereby FIG. 4A illustrates the entire sequence, FIG. 4B a sequence table for the conveyor belt, FIG. 4C parameter sets of the conveyor belt, and FIG. 4D a sequence table for the adhesive unit comprising the grippers.

FIG. 6A shows the design of the synchronization component, and

FIG. 6B shows parameter sets of the synchronization components.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art.

However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Also, signal names used below are exemplary names, indicative of signals used to perform various functions. In some cases, the relative signals may vary from device to device. Furthermore, the circuits and devices described below and depicted in the figures are merely exemplary of embodiments of the invention. As recognized by those of ordinary skill in the art, embodiments of the invention may be utilized with any device.

Figure 1:
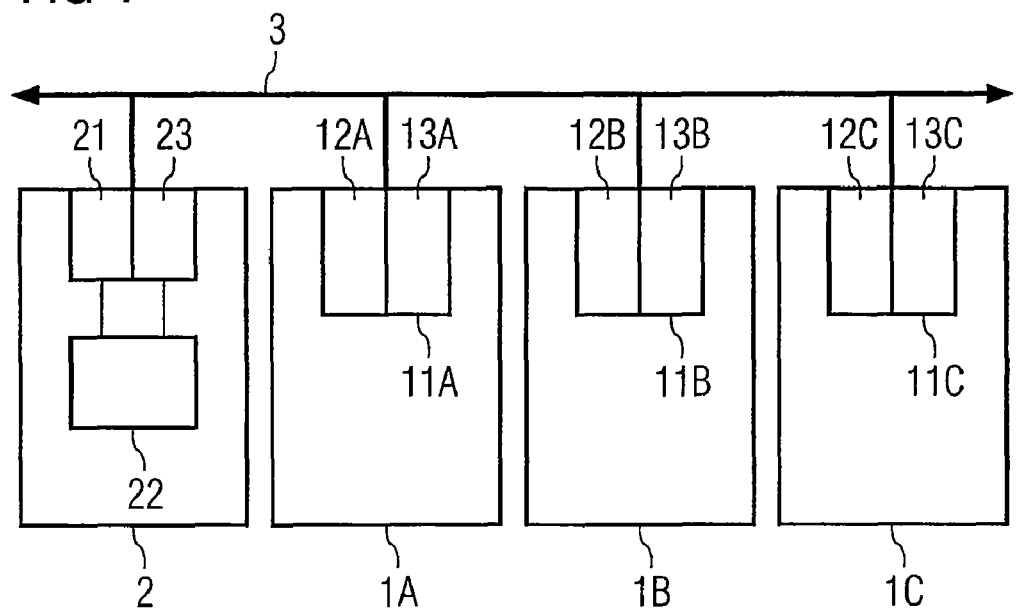
FIG. 1 schematically illustrates a network having a control node and a network configurator.

In industrial automation, i.e. the controlling and monitoring of technical processes by means of software, decentralized control systems are increasingly used. In decentralized control systems, the control task is divided up among control nodes. The control nodes thereby communicate with each other and, if necessary, with the superordinate system via an industrial local network. FIG. 1 shows such a decentralized control system comprising three control nodes 1A, 1B, 1C and a network configurator 2 for configuring and monitoring the network. The control nodes 1 and the network configurator 2 thereby form a local communication network, which is known as local area network (LAN). LANs are local communication networks which are limited to a geographical area and consist of one or more servers or work stations, which is known as control nodes, and which are connected to each other via a communication line 3, e.g. a twisted-pair cable or a fibre-optic cable. For LANs, various network configurations are conceivable, the most common being the bus, ring, star and tree structure. FIG. 1 shows a LAN configuration having a bus structure.

An essential demand to the LAN when utilized in industrial automation as what is known as a field bus system is real-time functionality. The field-bus system must guarantee that each transmitted data packet reaches the recipient within a limited guaranteed time. LANs are operated by means of a network operating system and a unified network protocol. Thereby, the preferred communication standard is the Ethernet concept. The Ethernet concept actually offers the possibility of using standard hardware and software components. Furthermore, the Ethernet concept is marked by a simple network technology while simultaneously having a high-data transmission rate.

In the OSI layer model, the international reference model for data transmission in networks which is made up of a stack of seven layers whereby an amount of protocols is defined by each layer which allocates its service to the respective next higher level, the internet is allocated to the second layer, which is known as the conductor layer. In this conductor layer the data to be transmitted are bundled to form packets to which specific information for the respective communication protocol is added. Within the network, the conductor layer is responsible for transmitting the data packets from control node to control node as well as for error detection. In the Ethernet concept, the conductor layer is divided up into two levels, the first level adding a first head section to the data, the head section comprising information required for a correct data transmission by the receiving protocol. On the second level, the data packet to be transmitted is encapsulated with a further head section and an end section for the transport of the data packets from control node to control node. By means of such Ethernet packets which are also referred to as Ethernet telegrams, data having a length of up to 1500 bytes can be transmitted.

In order to be able to also use the Ethernet concept in industrial automation which requires real-time functionality, each control node 1 comprises a network interface 11 for real-time operation. Thereby, the network interface 11 may be realized within the control node in terms of hardware as well as software technology. The network interface 11 within the control node 1 allows for the parallel use of the bus system 3 for determining data for real-time applications and non-real time applications. The data for real-time applications are thereby prioritized by the network interface 11 so that at first real-time data are transmitted, and in the time remaining until transmission of the next real-time applications the data for non-real time applications are transmitted.

For the data transmission via the bus system 3, the network interface 11 of the control nodes 1 is subdivided into a transmitter module 12 and a receiver module 13. The transmitter module 12 manages the data to be transmitted in an output process image. The data packets are e.g. transmitted in the form of Ethernet telegrams. The transmitter module 12 of the transmitting control node 1 converts the output process image into a data packet according to the network protocol and then outputs the data packet onto the network at a predetermined point in time. The receiver module 13 of the receiving control node 1—the receiver module 13 may be logged on for receiving data packets outputted by one or more transmitter modules 12 by further control nodes 1—then converts the received data packet into an input process image which may be processed by the control node 1.

By means of this configuration, it is possible to determine the communication relations between the control nodes in the network flexibly and even during system cycle time, i.e.

dynamically, and thus to achieve a decentralized control system having a high compatibility with regard to the utilized apparatuses and devices in a simple manner. Modifications in the production and manufacturing process, e.g. extending or changing the range of production, may be carried out in a simple manner by changing the communication relations, i.e. re-determination of the transmitter-receiver-module relations which indicate which control node must transmit data to which further control nodes.

The determination of the communication relations of the transmitting and receiver modules is preferably carried out within the framework of an initializing phase by means of the network configurator 2. The network configurator 2 therefore comprises a recording module 21 in order to determine the control nodes connected to the network. The recording module 21 is connected to a configuration module 22 in the network configurator 2 which determines the communication relations of the transmitting and receiver modules 12, 13 of the determining control nodes 1, i.e. which control node is to log on to which other control node by means of its receiver module in order to receive data from its transmitter module. The configuration module 22 is in turn connected to a programming module 23 which then transmits the communication relations determined by the configuration modules between the control nodes within the network to these control nodes.

However, the network configurator 2 is able to dynamically adapt the communication relation between the control nodes and/or the subscribers in the control nodes after the initializing phase, as well. By means of this configuration, a reaction to an extension or modification of the product range is possible in a simple manner. The network configurator 2 then allows for carrying out corresponding adaptations of the communication relations between the individual control nodes and/or the subscribers within the control nodes by simple re-programming.

Figure 2:
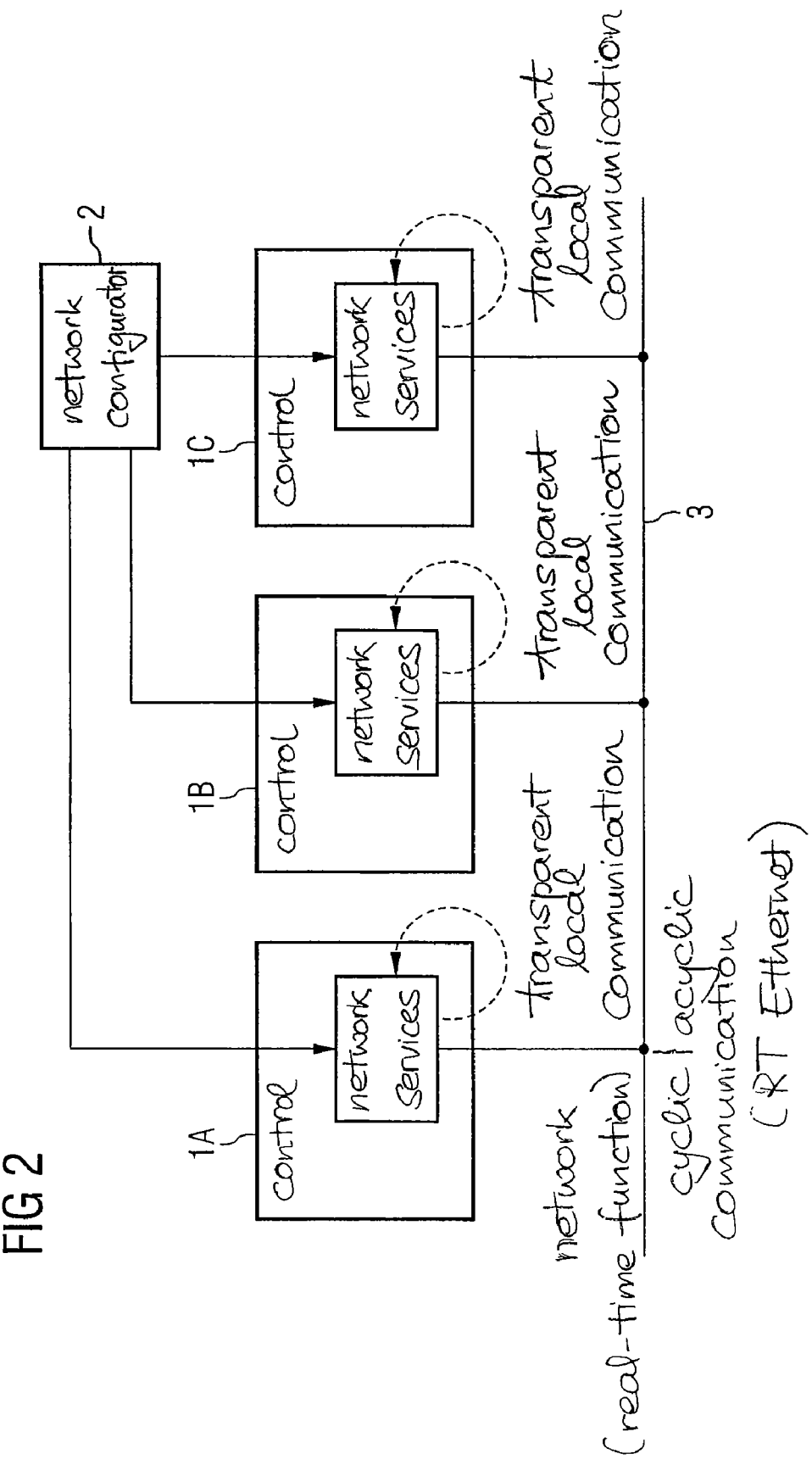
FIG. 2 shows an initializing phase in a network according to the invention.

The initializing phase of the decentralized control system shown in FIG. 1 is shown in detail in FIG. 2. The arrows in the Figure indicate the executed data exchange. In a first step of the initializing phase, the network configurator 2 determines the control nodes 1 connected to the network. The control nodes therefore comprise an unambiguous address associated to the respective control node via which the control node may be addressed. The control node may acquire this address e.g. during booting at the bus system via the dynamic configuration protocol (DHCP) or via automatic IP. However, the address may also have been preliminarily stored within the control node.

For automatically recognizing the control nodes 1, the network configurator 2 may use various mechanisms. The recording module of the network configurator 2 may transmit a so-called broadcast telegram to all control nodes 1 connected to the network 3. The control nodes 1 then respond to the broadcast telegram by means of a reply telegram, thereby announcing their valid address. Alternatively, it is possible that each control node automatically transmits an identification telegram to the recording module of the network configurator 2 by means of its address during booting.

In parallel to the address detection, the recording module 21 of the network configurator 2 may also retrieve a device specification characterizing the network properties and the function of the control node from the control node and/or the control node may automatically transmit the device specification to the recording module of the network configurator during booting.

On the basis of the number of determined control nodes as well as their device properties, the configuration module 22 of the network configurator 2 then determines the communication relations between the control nodes at the network, i.e. which control node is supposed to log on to which other control node by means of its receiver module for receiving data of its transmitter module. For this purpose, the configuration module 22 preferably comprises a system object model comprising a standardized system illustration and a process description which are combined with the device properties of the determined control nodes in order to define the communication relations. As an alternative to entering the device specification via the control node, the device specification may also be read in via an external database or be directly entered into the network configurator 2 via a man-machine interface. The system illustration and the process description may be provided to the network configurator e.g. via an engineering system.

The communication relations between the control nodes 1 determined by the network configurator 2 respectively indicate the transmitter module transmitting the data and the receiver module receiving the data as well as the data transmission type and the data type. The data records comprising the communication relations are written into the control nodes 1 via the bus system 3 by means of the programming module 23 of the network configurator 2. Upon finalizing the initialization process, the decentralized control is switched to machine operation in order to carry out the desired production and manufacturing process. In this operating mode, the network configurator 2 is no longer required. The network configurator 2 may then either be switched off or take over a monitoring function in the production and manufacturing process, i.e. for example malfunction monitoring and diagnosis.

During the production and manufacturing process, the control nodes exchange data according to the communication relations provided by the network configurator. The transmitter module of the transmitting control node may thereby transmit data directly to the receiver module of the receiving control node in a point-to-point connection. As an alternative, the transmitter module of the transmitting control node may also send the data to the receiver modules of a plurality of receiving control nodes. Moreover, there is the possibility of transmitting the data via the transmitter module of the transmitting control node to the receiver modules of all control nodes connected to the network. As a general rule, non-real time data are thereby exchanged in an acyclic manner via point-to-point connections. Such non-real time data are incidental data or parameter data for characterizing the product and the process flow. Data, in particular process data required for executing real-time applications, however, are transmitted to all control nodes in a cyclic manner. In the case of real-time data, point-to-multiple-point connections and/or broadcast transmissions may be carried out.

Figure 3:
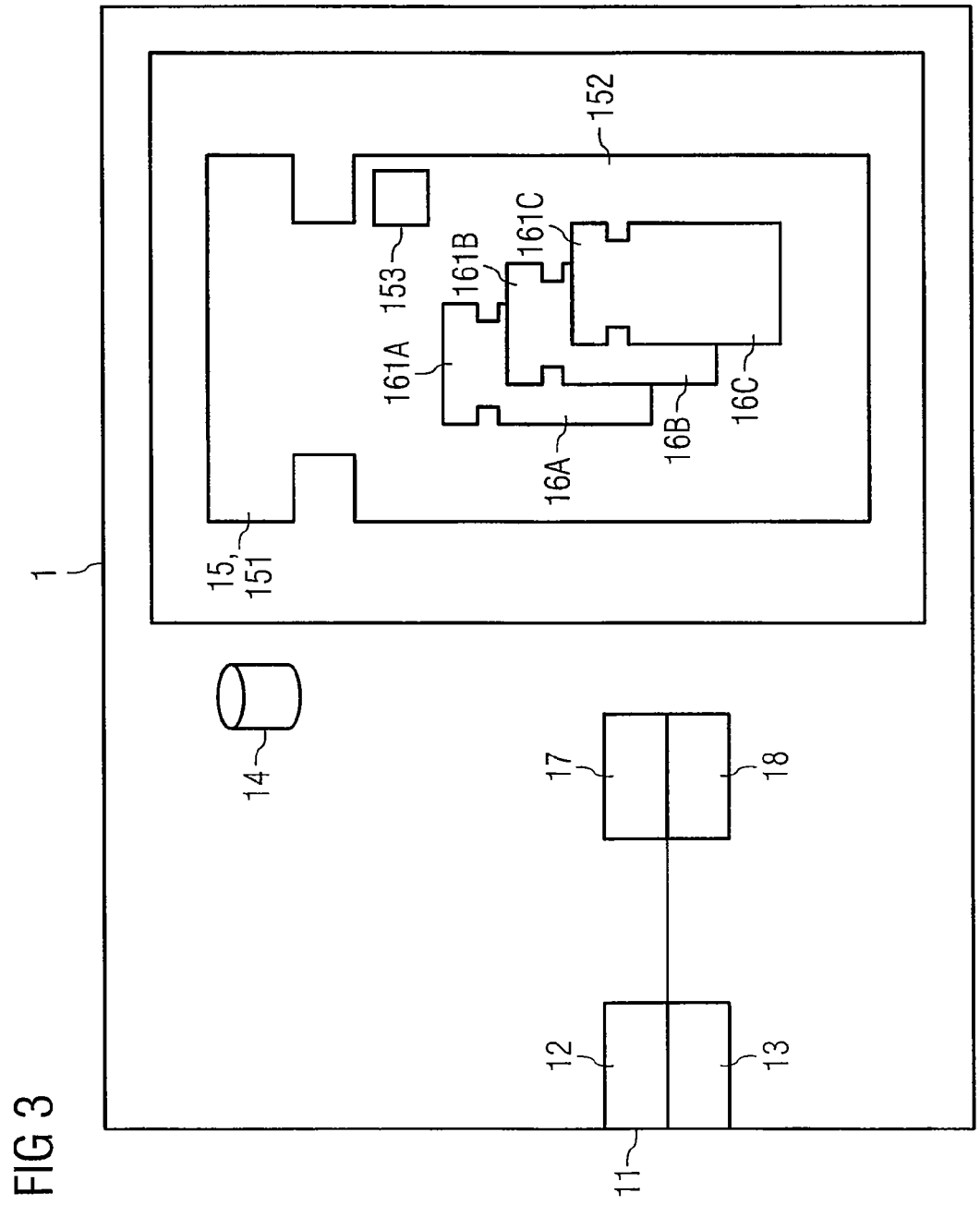
FIG. 3 shows a control node architecture.

FIG. 3 schematically shows the potential configuration of a control node. Apart from the network interface 11 comprising the transmitter module 12 and the receiver module 13, each control node comprises a device specification representing the functional and communicational properties of the control node. The form of this device specification is preferably standardized for all control nodes and stored in the memory area 14 of the control node as a file. The device specification may be accessed by superordinate systems or by the network configurator. The device specification may also be modified externally, i.e. in turn by the network configurator and/or a superordinate system or by a man-machine interface in order to adapt the functional and communicational properties of the control node to the current state.

The device specification of the control node illustrating the hardware of the control node and its function and/or interface to the outside is associated with a machine model 15 in the control node. The machine model 15 images the device properties in the form of functionalities and thus decouples the device functionalities from the genuine hardware control. By means of the machine model, the system and/or the functionalities within the control nodes may be modularized in a simple and effective manner, thus configuring a decentralized control system. The machine model encapsulates the device functionality and thus provides autonomous module units which may be operated in a self-sustaining manner, i.e. without managing system, for all device, communication and functional units, each following a unified abstract operational flow.

In order to process the incidental, parameter and process data streams, the control nodes each obtain an incident recording module 17 and a data recording module 18 which are connected to the network interface 11, to the transmitter module 12 and the receiver module 13, as shown in FIG. 3. Incidents, i.e. indications, notifications, errors in the ongoing machine operation etc. are classified by the incident recording module 17 and subsequently latched. Further, particularly superordinate control nodes have the possibility of accessing the latched incidents. The incidents are thereby classified as incidents which must be acknowledged and incidents which do not have to be acknowledged. Incidents that must be acknowledged have to be acknowledged by an authorized unit before they can be removed from the incident recording module 17. The data recording module 18 stores the parameter and process data and allows for further, particularly superordinate control nodes and also for the network configurator to access these parameter and process data.

The machine model 15 is divided up into an organizing unit 151 and a functional unit 152. The organizing unit 151 determines the state of the control node. The state of the control node indicates the operating mode, i.e. if the machine is operated manually, semiautomatically or automatically, and if the machine is in an initializing mode or in a machine operation mode. Moreover, the operating state of the control node is defined in the organizing unit 151. Operating states may e.g. be start, stop or error mode. The operating states are unambiguously defined and processed by the organizing unit 151 of the machine model 15 in the control node 1. Furthermore, the organizing unit 151 of the machine model 15 in the control node 1 provides that the transitions between the operating states are unambiguous. The organizing unit 151 thus represents a finite state machine which provides that the desired state is achieved by the control node even without relying on outside events.

The functional unit 152 of the machine model 15 in the control node 1 comprises the application programmes associated with the respective operating states, in particular the manufacturing sequences, which are initialized by the functional unit 152 depending on the operating state set by the organizing unit. The application programmes in the functional units of the control nodes and/or in the functional units of the subscribers in the control nodes are accessed via individual identifications. The organizing unit 151 thereby comprises the identification and the functional parameters of the functional unit 152 to be accessed and carries out the access. Thereby, a functional unit provides an elementary function which may parameterized from the outside. The total functionality then results from the configuration of the elementary functions. These elementary functions may be composed of subordinate elementary functions and in turn form an elementary super function.

The control nodes are subdivided into subscribers 16A, 16B, 16C which individually and in a self-sustained manner define accessable functions of the control node. The subdivision of the control nodes as subscribes is freely configurable and independent from the real hardware control. By subdividing the control nodes into subscribers, the data communication rate may be optimized. In the case of a data transmission between the control nodes, the data transmission is carried out according to the network protocol, i.e. in particular according to the Ethernet protocol, whereby the transmitting control node converts the output process image to be transmitted into a network data packet, i.e. for example an Ethernet telegram, by means of its transmitter module, and then outputs the data packet to the network at a predetermined point in time. The control nodes which are logged on to this transmitter module by means of their receiver modules then re-convert the received data packet into an input process image. If, on the contrary, the data communication is to be carried out internally within the control nodes between the subscribers in the control node, the data exchange is preferably carried out in a transparent manner by means of data imaging processes with a direct data access of the subscribers to the control node process image transmitted between the subscribers. These direct data imaging processes of the subscribers in the control nodes provide for fast data exchange without extensive conversion processes and/or transfer processes via the transmitting and receiver modules.

The data transmission processes, i.e. the direct data imaging between the subscribers and the network protocol conversions between the control nodes are preferably provided by the network configurator in the context of the initializing process described above. The communication relations between the subscribers in the control node are thereby subdivided into incidental, parameter and process data streams in an analogous manner to the communication relations between the control nodes. At the same time, the type of data transmission between the subscribers, i.e. if the data transmission is to be carried out in a cyclic or acyclic manner, is determined.

Subdividing the control nodes into subscribers with individual functionalities which are independently accessible and which may be freely configured allows for optimal subdivision of any desired manufacturing process. The total sequence of the manufacturing process is thereby divided up into partial manufacturing sequences distributed to various control nodes. The functional unit 152 of the machine model 15 comprises a sequence table 153 which determines the manufacturing sequence associated with the control node 1 within the total frequency of the manufacturing process. The sequence table 153 comprises an identification for an action within the manufacturing sequence, an identification for a subscriber 16 associated with the action within the control node which may carry out said action by means of its encapsulated functionality, as well as an identification for the parameter set required for executing the action. Each subscriber 16A, 16B, 16C in turn comprises a sequence interpreter 161A, 161B, 161C which is able to read and to interpret the sequence table 153, and to initiate the action associated with the subscriber.

The sequence interpreters 161 of the subscribers 16 are controlled by means of signalling data on the basis of which the sequence interpreter 161 processes the sequence table 153. The signalling data thereby particularly comprise a trigger signal causing the signal interpreter in the subscriber to carry out the action associated with the subscriber according to the sequence table. The signalling data required for the respective subscriber are preferably provided by the sequence table 153 itself. Thereby, it is possible to determine that the subscriber requires one single triggering signal or several triggering signals for processing the sequence table. These triggering signals may in turn be generated by other subscribers. This is particularly the case if already executed actions of these subscribers are a condition for carrying out the action of the subscriber.

If, however, an action in a subscriber of a different control node is required for executing an action in a subscriber of a control node, the generation of signalling data for the subscriber is effected by means of a synchronisation component. The synchronisation component represents a functionality of the control node and is handled as a subscriber 16 which comprises a sequence interpreter 161. The sequence interpreter of the synchronisation component reads and interprets the signalling data applied to the receiver module 12 of the control node 1, which have in turn been transmitted from a transmitter module of a further control node, according to the sequence table 153 of the control node 1. The data records associated with the synchronisation component in the sequence table thereby preferably represent a Boolean operation such as AND, OR, NAND, NOR or XOR for the applied signalling data in order to generate a trigger signalling data for one or more subscribers in the control node. The subscribers then continue to process the sequence table of the control node on the basis of this signalling date.

The signalling data transmitted from the transmitter module of the transmitting control node to the receiver module of the receiving control node which serve to trigger the subscribers in the receiving control node are in turn preferably generated by a synchronisation component of the transmitting control node, the transmitting control node being configured as an independent subscriber. This synchronisation component of the transmitting control node generates the signalling data by means of its sequence interpreter by processing the sequence table of the transmitting control node and delivers them to the transmitter module for forwarding to the receiver module of the receiving control node. Thus, each control node as a subscriber preferably comprises two synchronization components for generating an internal signalling for the subscribers in the control node and/or for generating an external signalling for subscribers in other control nodes. These two functionalities may also be combined in one single synchronization component in the control node.

The data records in the sequence table are preferably encoded in a binary manner. The identification for the actions of a manufacturing sequence associated with the control node is thereby preferably continuously numbered in the data records. The identification for a subscriber carrying out the action is preferably in two parts. It characterizes the subscriber and/or the subscribers triggered by the action. Moreover, they are characterized by the way in which an action is to be terminated, i.e. if it is required that the action signals its own termination. The identification of the parameter sets associated with the actions is in turn preferably continuously numbered, in analogy to the identification of the actions themselves.

The various parameter sets are preferably summarized as a table and provided with an identification identical to the corresponding identification in the sequence table. Moreover, the parameter set associated with an action contains a product state output date for a comparison with a product state before executing the action, a product state final date for representing the product state upon successfully finalizing the action and action parameters determining the functionality of the action. Optionally, a timeout date is provided for the action in order to prevent a blocking of the manufacturing process and/or of other subscribers due to an error during the execution of the action and in order to be able to control the action in a simple manner.

By means of its sequence interpreter 161, the subscriber 16 reads the parameter set identified in the sequence table from a memory in the control node 1, which may e.g. be the memory 14 in the control node containing the device specification, after a corresponding triggering signal in order to initiate the addressed action. In this process, the subscriber receives an actual state value as a signalling date for a product to be processed in the context of the action. The sequence interpreter 161 compares this actual product state value to the product state output date in the parameter set associated with the action when processing the sequence table 153, possibly in order to determine an error and, if the case may be, to signal this error to the recording module 17 in the control node. The signalling date indicating the actual state value of the product to be processed in the action may simultaneously be the triggering signal causing the sequence interpreter 161 of the subscriber 16 to initiate the action.

Upon successfully finalizing the action, the sequence interpreter 161 of the subscriber 16 then outputs a signalling date indicating the actual state value of the product processed within the framework of the action and, if the case may be, serves as a triggering signal for a further subscriber. The sequence interpreter 161 of the subscriber 16 thereby takes over the product state final date of the parameter set associated with the action as a signalling date for the actual product state. Within the control node, the signalling data are transmitted to further subscribers in the context of data imaging processes, whereby the further subscribers may directly access the signalling data. The output signalling data then again initiate the further processing of the sequence table as a triggering signal by means of the sequence interpreter of the other subscribers. As an alternative, if the synchronization component is indicated in the sequence table as identification of the accessed subscriber, said synchronization component may generate a triggering signal for a subscriber in one of the other control nodes which is then output via the transmitter module of the control node.

By dividing up a manufacturing process into partial manufacturing sequences which are associated with the individual control nodes in the form of a sequence table, it is possible to carry out modifications in the manufacturing process by re-programming the sequence table. The individual parameter sets of the sequence table may be flexibly adapted to modifications in the manufacturing process, as well, without the requirement of extensive direct programming of the control node. The sequence table and/or the parameter sets may in this context, e.g. during the initialization process, be transmitted to the individual control nodes by the network configurator 2. It is also possible to modify the sequence table and/or the parameter sets during machine operation by means of the network configurator 2 or by means of another control unit.

As an example, FIG. 4 illustrates a manufacturing process with two control nodes. Thereby, one control node is a conveyor belt 101 and the other control node is an adhesive unit comprising grippers 102. The control node conveyor belt 101 is divided up among six subscribers having independent functionalities, i.e. an identification unit 111, preferably a what is known as a RFID reader, a data collecting unit 121, a synchronization component 131, a fixing unit 141, a transporting unit 151 and an identifying unit 161, preferably an RFID transponder. The adhesive unit 102 comprises a synchronization component 112, a gripper 122 and an adhesive 132 as subscribers with individually addressable functionalities.

Figure 4A:
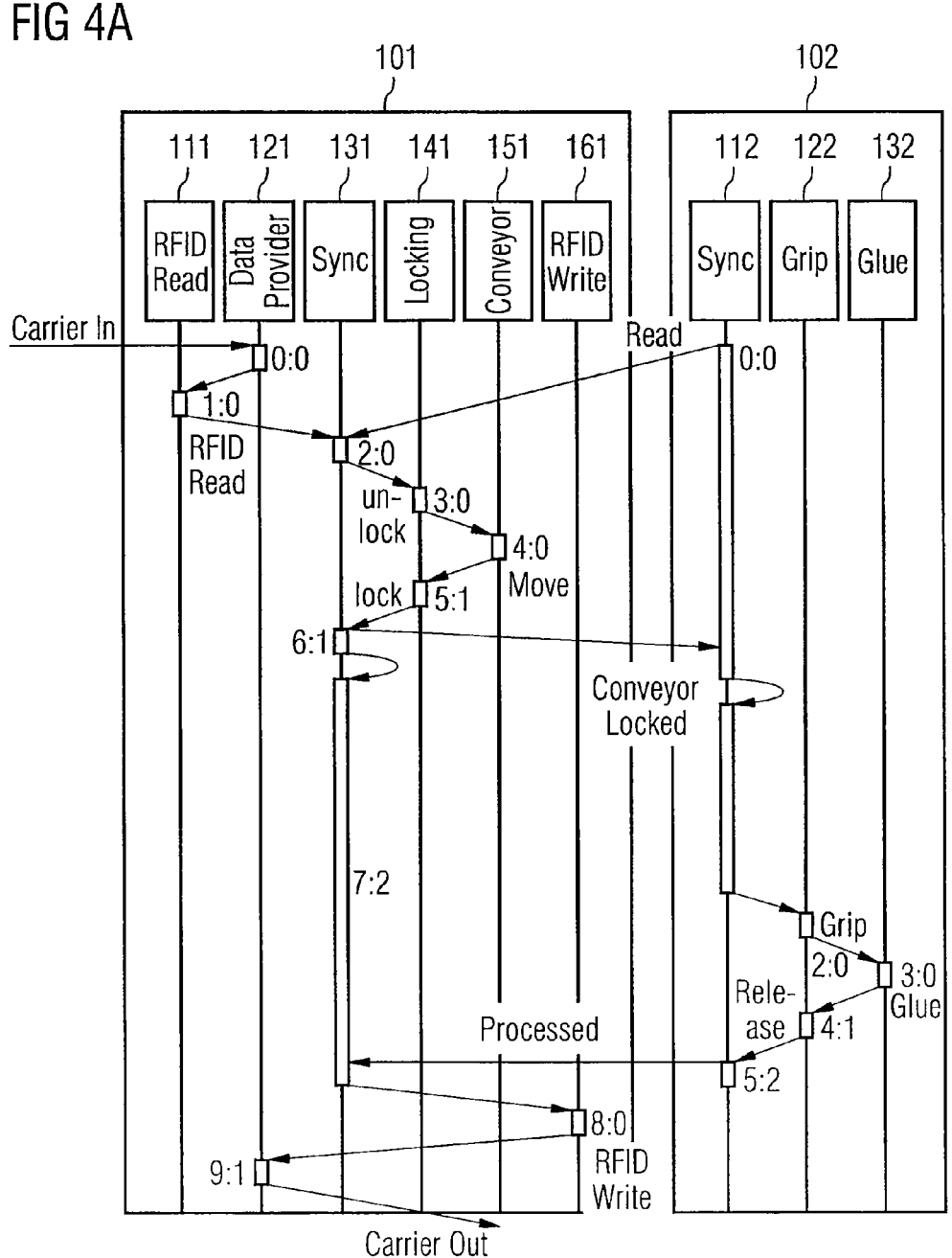

FIG. 4A shows the total sequence of a manufacturing process, FIG. 4B the sequence table for the control node conveyor belt 101, FIG. 4C the parameter sets for the control node conveyor belt 101 and FIG. 4D the sequence table for the control node adhesive unit 102. The manufacturing sequence for the control node conveyor belt 101 comprises ten actions characterized in ten data records. The data records of the sequence table of the control node conveyor belt are divided up into three categories, as shown in FIG. 4B, whereby the first category identifies the individual action within the manufacturing sequence and is continuously numbered from 0 to 9. The second category of the data records characterizes the subscriber carrying out an action, the category being in two parts and indicating the subscriber, and also at the same time identifying whether it is necessary that the action signals its termination. These two data of the second category are encoded in a binary manner, whereby the state TRUE is characterized by a 1. As a third category, the data record comprises an identification of a parameter set associated with the action. The parameter sets are again continuously numbered, herein from 0 to 3.

As shown in FIG. 4C, the three parameter sets of the sequence table for the control node conveyor belt 101 are summarized in a recipe table and comprise an indexing corresponding to the indexing of the sequence table. The parameter sets thereby comprise the following categories: a product state output date, a product state final date, two action parameters—in this case distance and speed—as well as a timeout date.

The sequence table and the parameter sets of the control node adhesive unit 102 are configured analogously. Thereby, FIG. 4D only shows the sequence table comprising six actions which are continuously numbered from 0 to 5. The parameter sets associated with the actions are not shown in FIG. 4D.

FIG. 4A shows the processing of the sequence table by means of the sequence interpreters of the subscribers in the control node conveyor belt 101 and/or in the control node adhesive unit 102. Thereby, the data paths for the signalling data transmitted between the subscribers are characterized by arrows. The sequence interpreter of each subscriber expects an actual product state value for the product to be processed as a trigger signal within the framework of the action associated with the subscriber. The executed action then modifies this actual product state value according to the product state final date in the associated parameter set. The actual product state value issued by the sequence interpreter of the subscriber after finalizing the action then initiates the desired further action in the subscriber to be initiated next according to the sequence table and thus provides the required synchronization of the actions.

FIG. 4A shows the timing of the manufacturing process as lines from top to bottom for each subscriber, whereby the actions to be carried out by the individual subscribers are plotted in the shape of boxes on the line and provided with the action identification and the parameter set identification. In the process flow characterized in FIG. 4A, the data collecting unit 121 in the conveyor belt 101 detects the product in a first action and indicates the actual product state value to the RFID reader 111. The RFID reader 111 in turn transmits the new actual product state value to the synchronization component 131 in the conveyor belt 101 upon execution of the associated action. The synchronization component 131 simultaneously receives a further signalling date from the synchronization component 112 of the adhesive unit. The synchronization component 131 in the conveyor belt 101 links these two synchronization data according to the parameter set identified in the sequence table and signals the actual product state value to the fixing element 141 in the conveyor belt 101, which signals the actual product state value to the transporting unit 151 upon executing the associated action, which in turn transmits the actual product state value to the fixing unit 141 upon processing the desired action. The fixing unit 111 then upon finalizing the associated action forwards the actual product state value to the synchronization component 131 in the conveyor belt 101.

The synchronization component 131 in the conveyor belt 101 thereupon generates two signalling data, namely for itself and for the synchronization component 112 in the adhesive unit 102. The synchronization component 112 in the adhesive unit 102 then initiates the gripper 122 by means of the actual product state value, and the gripper 123 initiates the adhesive 132 upon executing the associated action. The adhesive 132 then triggers the gripper 122 by means of the actual product state value upon executing the desired action and the gripper 122 subsequently triggers the synchronization component 121 in the adhesive unit 102, which then generates a signalling date for the synchronization component 131 in the conveyor belt 101. The synchronization component 131 in the conveyor belt 101 activates the RFID transponder 151 which upon execution of the associated action initiates the data collecting unit 121 by means of the actual product state value which subsequently terminates the manufacturing process by means of a data output.

When processing the action, the timeout parameter in the parameter sets of the recipe table provides that the subscriber carries out a signalling when a certain period of time for the action is exceeded so that the further subscribers waiting for this signalling may then continue to process the sequence table by means of their sequence interpreters already prior to finalizing the action. Thereby, what is known as deadlocks in the manufacturing process may be prevented. At the same time, an error detection can be carried out in the control node by means of the recording module 17.

Figure 5:
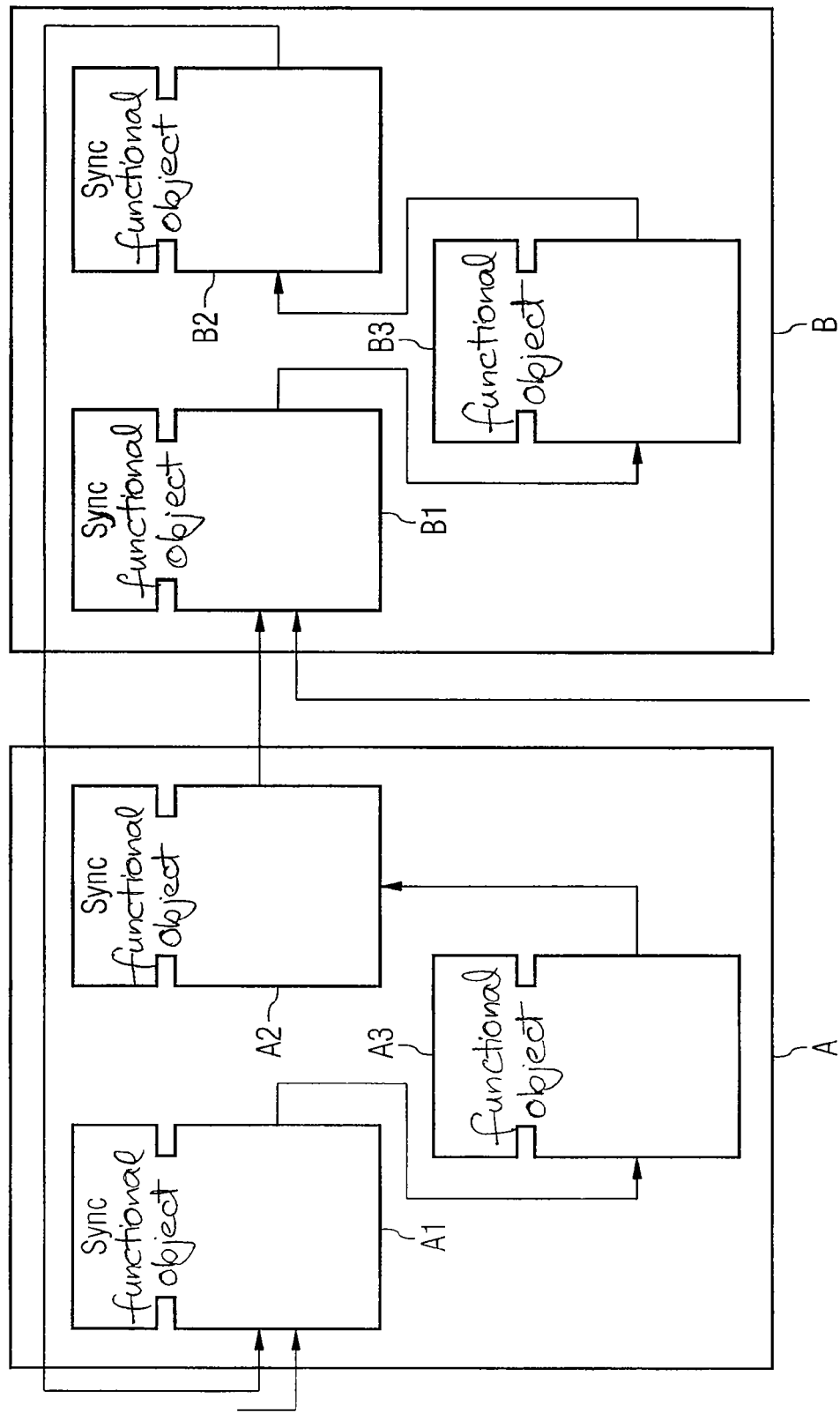
FIG. 5 shows a data exchange between two control nodes comprising synchronization components as subscribers.

FIG. 5 shows in more detail the synchronization of actions between control nodes by means of synchronization components configured as subscribers by means of the examples of two control nodes A, B. Each control node A, B thereby comprises a receiving synchronization component A1, B1 for receiving signalling data of further control nodes and a transmitting synchronization component A2, B2 for outputting signalling data to further control nodes. In addition, FIG. 5 shows a further functional subscriber A3, B3 in the illustrated control nodes for executing a control-node function. By means of the synchronization component, it is possible to guarantee synchronous manufacturing processes across control node boundaries in a simple manner.

The arrows in FIG. 5 indicate the signalling data paths. Receiving synchronization component A1 in the control node A thereby holds signalling data from the transmitting synchronization component B2 of the control node B and of a further control node (not shown). On the basis of this signalling data, the receiving synchronization component A1 in the control node A generates a signalling date for the subscriber functional object A3 in the control node A by means of a logic operation, which then initiates the desired action on the basis of a sequence table. Upon finalizing the action, the subscriber functional object A3 signals to the transmitting synchronization component A2 in the control node A, which on the basis of this signalling date generates a signalling date for the receiving signalling component B1 in the control node B. The receiving signalling component B1 in the control node B furthermore receives an additional signalling date from a further control node. By means of a logic operation, the receiving synchronization component B1 in the control node B then generates a signalling date for the subscriber functional object B3 in the control node component B which initiates a desired action on the basis of a sequence table and upon finalizing the action forwards a signalling date to the transmitting synchronization component B2 of the control node B, which then generates the synchronization date for the receiving synchronization component A1 of the control node A.

Figures 6A, 6B:
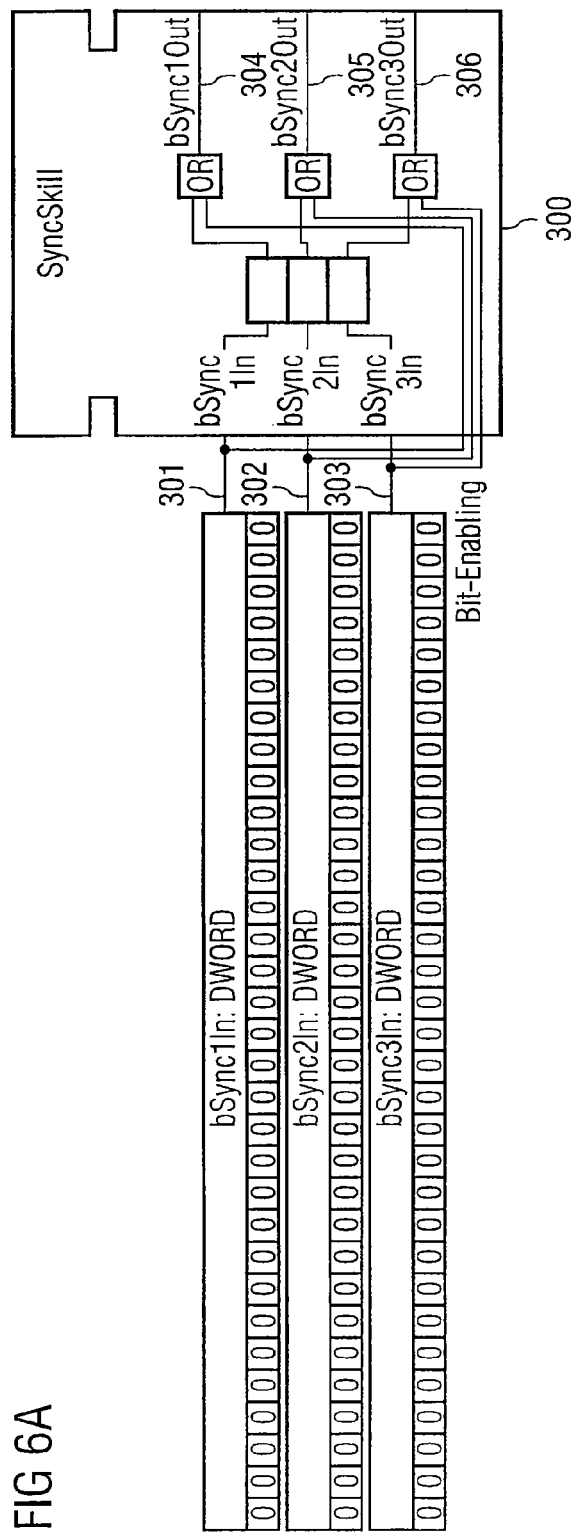
FIGS. 6A-6B illustrate a synchronization component, whereby

FIG. 6 shows in more detail a potential configuration for a synchronization component 300 which serves as a receiving as well as a transmitting synchronization component in a control node. In FIG. 6A, the configuration is schematically shown in this context and in FIG. 6B, parameter sets for the synchronization process are shown. In the synchronization component 300 shown in FIG. 6A, three signalling inputs 301, 302, 303 and three signalling outputs 304, 305, 306 are provided. For the receiving synchronization, the synchronization component 300 carries out a logic operation for each of the three synchronization inputs 301, 302, 303 according to the parameter sets associated in a sequence table.

In FIG. 6B, three possible parameter sets for three different synchronization operations are shown, parameter set 1 carrying out an AND, an OR and an OR operation, parameter set 2 carrying out an OR, an OR and an OR operation and parameter set 3 carrying out an OR, an OR and an AND operation. In the parameter sets, the product state output date and the product state final date are thereby indicated analogously to the parameter sets of the functional subscribers.

If the synchronization component 300 serves as a transmitting synchronization component for the control node, an unconditioned signalling to the synchronization outputs 304, 305, 306 is carried out on the basis of the provided parameter sets of the sequence table instead of logic operations. In FIG. 6A, the double function of the synchronization component 300 as transmitting synchronization component and receiving synchronization components may be controlled by means of OR operations which are arranged in front of the synchronization outputs 304, 305, 306. Further possible logic operations apart from AND and OR, as carried out according to the parameter sets in FIG. 6B, are NAND, NOR or XOR.

Figure 7:
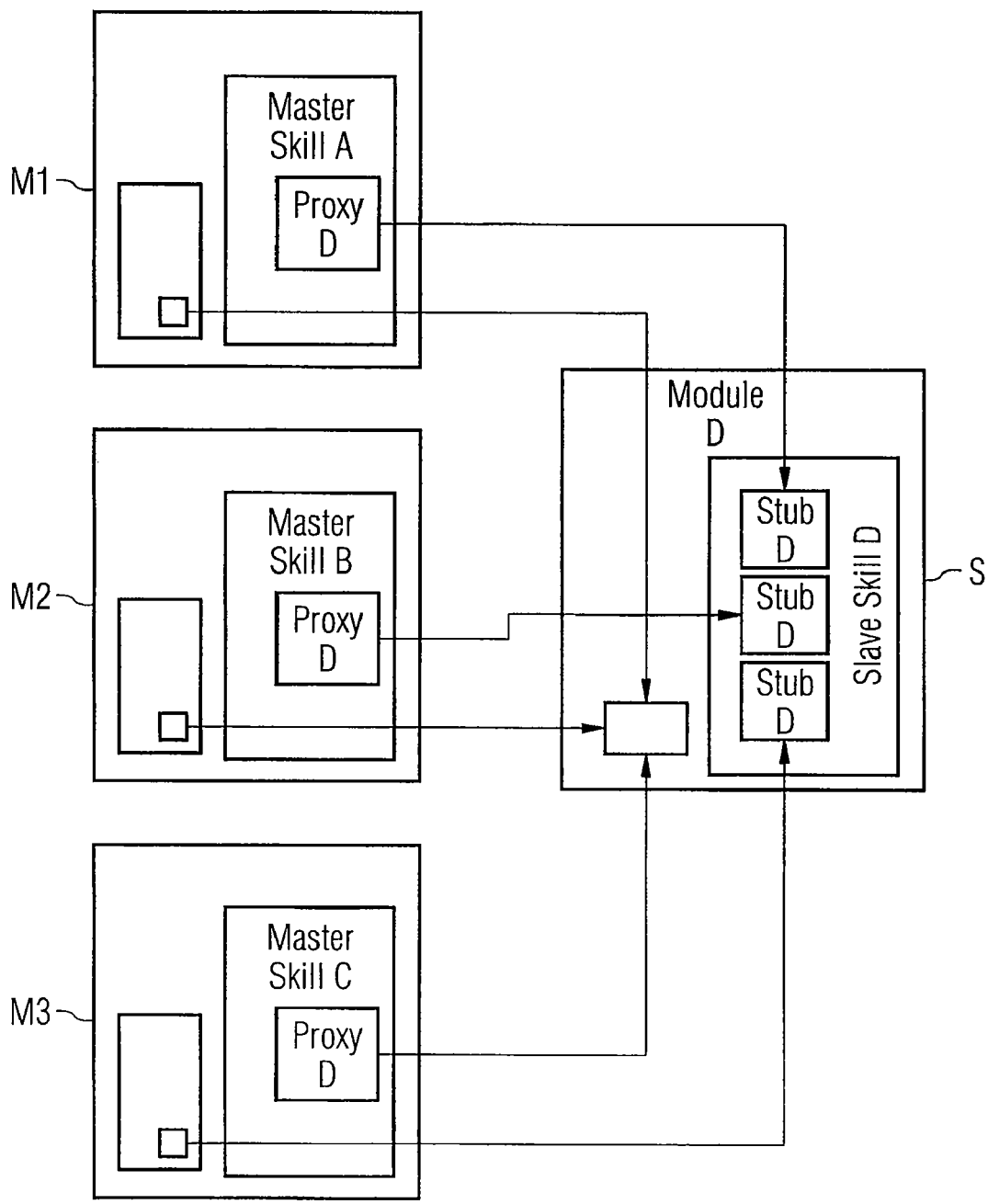
FIG. 7 illustrates a data exchange between four control nodes according to a master slave subscriber concept.

A further transition to more flexibility of the decentralized control may additionally be effected by a close deterministic coupling of the subscribers even across control node boundaries. FIG. 7 shows a data exchange between four control nodes M1, M2, M3, S according to a master-slave subscriber concept. In the master-slave subscriber concept, one subscriber in the control node is configured as a master subscriber and a further subscriber which may be provided in the same or in a further control node is configured as a slave subscriber, the master subscriber using the slave subscriber as a subordinate functional object. As shown in FIG. 7, in this concept it is also possible that a plurality of master subscribers, herein the master subscribers M1, M2, M3, address the same slave subscriber S.

In the context of actions carried out by the master subscribers M1, M2, M3, the slave subscriber S may address the parameter sets of the master subscribers M1, M2, M3 for carrying out its functionalities, as is shown in FIG. 7. For the data exchange, the master subscriber comprises a proxy Proxy D and the slave subscriber comprises a stub Stub D, whereby Proxy D converts input variables into a data telegram and transmits it to Stub D, and Stub D converts output variables into a data telegram after executing the slave function and transmits the data telegram to Proxy D. The data exchange between master-slave subscribers in a control node is thereby carried out in the form of data imaging processes across the control node boundaries, as shown in FIG. 6B, by means of the transmitting and receiver modules of the control nodes. The master-slave concept allows for further optimizing the subscriber functionalities as hierarchical functionality structures may be formed. Configuring and dismantling of the master-slave coupling may thereby be carried out in the initializing phase, e.g. by means of the network configurator or by means of the master subscriber itself.

According to the invention, the control node comprises a sequence table and subscribers, the sequence table having data records each comprising an identification for an action of a manufacturing sequence associated with the control node, an identification for a subscriber carrying out the action and an identification of a parameter set associated with the action. Thereby, each subscriber comprises a sequence interpreter which is designed to read and to interpret the sequence of the table and to initiate the action associated with the subscriber. According to the invention, the control nodes for carrying out manufacturing processes in a control are thereby connected to each other via a data communication network, the manufacturing process being divided up into manufacturing sequences comprising actions to be carried out by the respective control node.

The inventive configuration of the control node allows for a decentralized control in the form of an open system providing high compatibility and flexibility with regard to the function of the individual control nodes. The manufacturing process may be divided up into partial sequences to be carried out by the individual control nodes in a flexible manner, whereby the individual partial sequences may be defined directly within the control nodes without extensive programming by adapting the sequence table. The control nodes are thereby subdivided into subscribers which act in an autonomous manner by reading and interpreting the sequence table comprising the manufacturing sequence to be carried out by means of the sequence interpreter and eventually by initiating the task associated with the subscriber. Even during the manufacturing process, it is possible to carry out an adaptation to modifications in the manufacturing process by re-programming the sequence tables accordingly without interrupting the manufacturing process or having to re-program the entire system.

The sequence interpreter of the subscriber may process the sequence table on the basis of the signalling data of further subscribers. This procedure guarantees the individual actions of the manufacturing sequence to be carried out in a coordinated manner.

In order to carry out an effective synchronization across control node boundaries, a further preferred embodiment provides a synchronization component generating synchronization data for further subscribers. The synchronization component is thereby configured as a subscriber and generates signalling data according to an associated action. This configuration provides that the synchronization between the control nodes may be adapted to modifications in the production and manufacturing process in a simple manner. In order to adapt the synchronization, it is only required to change the action associated with the synchronization component.

The signalling data may be generated by the synchronization component via a logic operation of applied synchronization data, the logic operation being provided by the associated action. This procedure allows for the generation of triggered signalling data in order to guarantee correct execution of the manufacturing sequence.

The parameters associated with an action themselves may comprise a product state output date for comparison with an actual product state value prior to the execution of an action, a product state final date for representing the actual product state value upon successful execution of the action, as well as action parameters defining the functionality of the action. This configuration of the parameter sets in the sequence table provides a simple subdivision of the manufacturing processes among the individual functionalities of the control node. Thereby, the individual actions are unambiguously defined by determining the output and final state of the product and the functional parameters in between.

A timeout date may be integrated in the parameter set in order to prevent a blocking of the manufacturing process and/or other subscribers by means of an error during the execution of the action and in order to be able to control the action in a simple manner.

Further, the subscriber may receive an actual state value for a product to be processed within the framework of an action as a signalling date and the subscriber may send an actual state value of the product processed within the framework of an action as a signalling date upon successfully finalizing an action. By means of this procedure, the manufacturing process may be modularized in a simple manner. The exchange of product states as signalling dates allows for a standardization of the data communication between the subscribers and thus for quick data access.

The control node may comprise a memory for the sequence table, the parameters being retrieved from the subscriber upon initiating the action, respectively. This procedure allows for defining the manufacturing sequence centrally within the control node and, if the case may be, for carrying out an adaptation.

Further, the control node may comprise a transmitter module for exchanging data with other control nodes in the data communication network in the form of data packets, the transmitter module being configured to manage the data to be transmitted in an output process image, to convert the output process image into a data packet and to output the data packet onto the data communication network at a predetermined point in time. Moreover, the control node comprises a receiver module which is configured to log on for the data packets of one or more transmitter modules of a plurality of control nodes and to convert a received data packet into an input process image. By means of this configuration, the data communication between the control nodes may flexibly be adapted to manufacturing and processing procedures in a simple manner. The possibility that a control node may log on to the data packets of a plurality of control nodes by means of a receiver module provides a flexible configuration of the communications relations.

The transmitter module may directly address the data packet to one or more control nodes, whereby non-real time data are preferably transmitted in an a-cyclic manner. Alternatively, the transmitter module may also forward the data packet to all control nodes present in the network, thereby preferably transmitting real-time data in a cyclic manner. By means of this configuration, a parallel data transmission of real-time data and non-real time data may be achieved. The communication between the control nodes may thus be adapted to the production and manufacturing conditions in an optimal manner.

The data transmission between the subscribers within the control node may be configured in the form of data imaging processes, whereby each subscriber in the control node is configured to directly access the control node process image transmitted between the subscribers. This direct access during internal data transmission in the control node allows for a very quick data exchange with a low amount of protocol.

A subscriber in the control node may be configured as a master subscriber and another subscriber in the same or in a different control node may be configured as a slave subscriber, the master subscriber using the slave subscriber as a functional object in the master slave interconnection. The possibility of a master-slave interconnection allows for a hierarchical subscriber structure in order to optimally utilize the functionalities of the individual subscribers for the manufacturing process. Outwardly, the master-slave interconnection constitutes a unified functional block so that only a re-programming of the master subscriber is required in order to carry out an adaptation to modifications in the manufacturing process.

Further, the master subscriber may comprise a proxy and the slave subscriber may comprise a stub, the proxy converting input variables for the functional object into a data telegram and transmitting it to the stub, and the stub converting output variables of the functional object into a data packet and transmitting it to the proxy. This procedure allows for a simple data communication in the master-slave interconnection as the data may be tunnelled between the master subscriber and the slave subscriber in a transparent manner.

Alternatively, the master-slave interconnection may be provided by a network configurator or be produced by the master subscriber itself. These procedures allow for a flexible reaction to changes in the production and manufacturing process in the initialization phase as well as during the machine cycle by creating and dismantling master-slave interconnections.

While the foregoing is directed to embodiments of the invention, other and further embodiments of this invention may be devised without departing from the basic scope of the invention, the scope of the present invention being determined by the claims that follow.

The invention claimed is:

1. A control system for executing manufacturing processes comprising control nodes connected to each other via a data communication network, wherein the manufacturing process is divided up into manufacturing sequences comprising actions, the manufacturing sequences to be carried out by the respective control nodes, wherein each control node comprises a sequence table and subscribers, the sequence table comprising data records with a respective identification for an action of a manufacturing sequence associated to the control node, an identification for a subscriber executing the action and an identification of a parameter set associated with the action, and each subscriber comprising a sequence interpreter which is designed to read and to interpret the sequence table, and to initiate the action associated with the subscriber,
wherein a subscriber of each control node acts as a synchronization component, the synchronization component generating signalling data for further subscribers of the respective control node according to the action associated to the control node.

2. The control system according to claim 1, wherein the data transmission between the control node in the data communication network takes place in the form of data packets, each control node comprising a transmitter module configured to manage the data to be transmitted in an output process image, to convert the output process image into a data packet and to output the data packet to the data communication network at a predetermined point in time, as well as comprising a receiver module configured to log on for the data packets of one or more transmitter modules of further control nodes and to convert a received data packet into an input process image.

3. The control system according to claim 1, the transmitter module of each control node being configured to directly address the data packet to one or more further control nodes.

4. The control system according to claim 1, the transmitter module of each control node being configured to directly transmit non-real time data to one or more further control nodes in an acyclic manner.

5. The control system according to claim 1, the transmitter module being configured to transmit real-time data to all control nodes connected via the data communication network in a cyclic manner.

6. The control system according to claim 1, wherein a data transmission is carried out between the subscribers within the control node in the form of a data imaging process.

7. The control system according to claim 1, wherein a subscriber in a control node may be configured as a master subscriber and a further subscriber in the same or in a further control node may be configured as a slave subscriber, the master subscriber using the slave subscriber as a functional object in the master-slave connection.

8. The control system according to claim 7, the master subscriber comprising a proxy and the slave subscriber comprising a stub, wherein the proxy converts input variables for a functional object into a data telegram and transmits it to the stub, and the stub converts output variables of the functional object into a data telegram and transmits it to the proxy.

9. The control system according to claim 7, wherein the master-slave connection is configured and dismantled by means of a network configurator.

10. The control system according to claim 7, wherein the master-slave connection is configured and dismantled by means of a master subscriber.

11. The control system according to claim 1, the sequence interpreter of the subscriber processing the sequence table on the basis of signalling data of further subscribers.

12. The control system according to claim 1, the synchronization component generating the signalling data for further subscribers by means of a logic operation of applied signalling data, the logic operation being provided by the associated action.

13. The control system according to claim 1, the parameter set associated with an action comprising:
a product state output date for a comparison with the actual product state value prior to executing the action,
a product state final date for rendering the actual product state value upon finalizing the action, and
action parameters determining the functionality of the action.

14. The control system according to claim 13, the parameter set associated with an action further comprising a timeout date for the action.

15. The control system according to claim 1, wherein each subscriber receives as a signalling date an actual product state value for a product to be processed in the context of the action.

16. The control system according to claim 1, wherein each subscriber issues an actual product state value for a product processed in the context of the action as a signalling date upon successful termination of the action.

17. The control system according to claim 1, comprising a memory for the parameter sets associated with the manufacturing sequence, wherein the subscriber retrieves a parameter set upon initializing the action, respectively.

18. A control system for executing manufacturing processes comprising control nodes connected to each other via a data communication network, wherein the manufacturing process is divided up into manufacturing sequences comprising actions, the manufacturing sequences to be carried out by the respective control nodes and each control node as a subscriber comprises a receiving synchronization component for receiving signalling data from further control nodes as well as a transmitting synchronization component for outputting signalling data to further control nodes.

19. The control system according to claim 18, wherein a synchronization component comprising signalling outputs operates as a receiving as well as a transmitting synchronization component, wherein the double function is controlled by means of OR operations of the signalling outputs.

20. The control system according to claim 18, wherein the data transmission between the control node in the data communication network takes place in the form of data packets, each control node comprising a transmitting module configured to manage the data to be transmitted in an output process image, to convert the output process image into a data packet and to output the data packet to the data communication network at a predetermined point in time, as well as comprising a receiving module configured to log on for the data packets of one or more transmitting modules of further control nodes and to convert a received data packet into an input process image.

21. The control system according to claim 18, wherein the transmitting module of each control node is configured to directly address the data packet to one or more further control nodes.

22. The control system according to claim 18, wherein the transmitting module of each control node is configured to directly transmit non-real time data to one or more further control nodes in an acyclic manner and to transmit real-time data to all control nodes connected via the data communication network in a cyclic manner.

23. The control system according to claim 18, wherein in that a data transmission is carried out between the subscribers within the control node in the form of a data imaging process.

24. The control system according to claim 18, wherein a subscriber in a control node may be configured as a master subscriber and a further subscriber in the same or in a further control node may be configured as a slave subscriber, the master subscriber using the slave subscriber as a functional object in the master-slave connection.

25. The control system according to claim 24, wherein the master subscriber comprises a proxy and the slave subscriber comprises a stub, wherein the proxy converts input variables for a functional object into a data telegram and transmits it to the stub, and the stub converts output variables of the functional object into a data telegram and transmits it to the proxy.

26. The control system according to claim 24, wherein in that the master-slave connection is configured and dismantled by means of a network configurator or by means of a master subscriber.

* * * * *